US009225939B1

(12) United States Patent
Kidd et al.

(10) Patent No.: US 9,225,939 B1
(45) Date of Patent: Dec. 29, 2015

(54) MOBILE STREAMING PROCESSING SYSTEM FOR VIDEO AND AUDIO CONTENT

(75) Inventors: Deanna R. Kidd, Long Beach, CA (US); Michael R. Munsell, Austin, TX (US); An P. Vuong, McKinney, TX (US); Darren J. Wolford, Redondo Beach, CA (US); Mitchell B. Wasden, Hermosa Beach, CA (US); Howard M. Buckley, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 480 days.

(21) Appl. No.: 12/879,957

(22) Filed: Sep. 10, 2010

Related U.S. Application Data

(60) Provisional application No. 61/241,836, filed on Sep. 11, 2009.

(51) Int. Cl.
*H04N 7/16* (2011.01)
*H04N 21/4627* (2011.01)
*H04N 21/45* (2011.01)
*H04N 21/258* (2011.01)
*H04N 7/173* (2011.01)

(52) U.S. Cl.
CPC ............... *H04N 7/162* (2013.01); *H04N 7/173* (2013.01); *H04N 7/17309* (2013.01); *H04N 21/258* (2013.01); *H04N 21/45* (2013.01); *H04N 21/4627* (2013.01)

(58) Field of Classification Search
USPC .......................................... 725/48, 63, 51, 40
See application file for complete search history.

(56) References Cited

U.S. PATENT DOCUMENTS

| | | | |
|---|---|---|---|
| 6,292,568 B1 * | 9/2001 | Akins et al. .................... 380/239 |
| 2002/0059621 A1 * | 5/2002 | Thomas et al. .................. 725/87 |
| 2007/0265970 A1 * | 11/2007 | Kahn et al. ....................... 705/52 |
| 2008/0034276 A1 * | 2/2008 | Ficco ............................ 715/201 |
| 2008/0244657 A1 * | 10/2008 | Arsenault et al. ............... 725/48 |

* cited by examiner

*Primary Examiner* — Jun Fei Zhong

(57) ABSTRACT

A system for delivering satellite signals to a plurality of display platforms. A system in accordance with one or more embodiments of the present invention comprises a first transmission system for delivering the satellite signals to a first display platform via at least one satellite, and a second transmission system, coupled to the first transmission system, for delivering at least a portion of the satellite signals to at least one second display platform, the first transmission system and the second transmission system transmitting in a substantially simultaneous manner, wherein the second transmission system transmits a data stream formatted for compatibility with the at least one second display platform.

17 Claims, 15 Drawing Sheets

MOBILE STREAMING PROCESSING SYSTEM FOR VIDEO AND AUDIO CONTENT

CROSS-REFERENCE TO RELATED APPLICATIONS

This application claims the benefit under 35 U.S.C. Section 119(e) of U.S. Provisional Application Ser. No. 61/241,836, filed on Sep. 11, 2009, Deanna R. Kidd et al., entitled "MOBILE STREAMING PROCESSING SYSTEM FOR VIDEO AND AUDIO CONTENT," which application is incorporated by reference herein.

BACKGROUND OF THE INVENTION

1. Field of the Invention

The present invention relates generally to satellite video systems, and in particular, to a method, apparatus, and article of manufacture for mobile streaming services in conjunction with satellite television broadcast systems.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location.

Satellite uplink signals 116 are transmitted by one or more uplink facilities 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz. Future satellites will likely broadcast in the Ka-band of frequencies, i.e., 18-40 GHz, but typically 20-30 GHz.

Viewers also may be away from their television sets that are connected to IRD 112, and, as such, typically cannot see any of the broadcast downlink signals 120 in other locations, such as at work or in their autos.

It can be seen, then, that there is a need in the art to deliver downlink signals to other platforms such as personal computers and mobile devices such as cellular telephones and Personal Data Assistants.

SUMMARY OF THE INVENTION

To minimize the limitations in the prior art, and to minimize other limitations that will become apparent upon reading and understanding the present specification, the present invention discloses methods and apparatuses for delivering satellite signals to a plurality of display platforms.

A system for delivering satellite signals to a plurality of display platforms in accordance with one or more embodiments of the present invention comprises a first transmission system for delivering the satellite signals to a first display platform via at least one satellite, and a second transmission system, coupled to the first transmission system, for delivering at least a portion of the satellite signals to at least one second display platform, the first transmission system and the second transmission system transmitting in a substantially simultaneous manner, wherein the second transmission system transmits a data stream formatted for compatibility with the at least one second display platform.

Such a system further optionally comprises the at least one second display platform is at least a computer having a monitor, the computer is coupled to the system via a network, the portion of the satellite signals delivered to the computer comprises at least a video stream, the portion of the satellite signals delivered to the computer further comprises statistics related to the video stream, the portion of the satellite signals delivered to the computer further comprises a second statistical area, wherein the second statistical area comprises a plurality of selectable areas to switch the video stream to a new video stream associated with each of the plurality of selectable areas in the second statistical area, when an area in the plurality of selectable areas is selected, the new video stream is displayed on the monitor, the at least one second display platform further comprises at least a mobile device having a screen, the mobile device is coupled to the system via a wireless network, the portion of the satellite signals delivered to the mobile device comprises at least statistics related to a video stream being transmitted on the first transmission system, the statistics are selected based on a characteristic of the statistic, and when a statistic is selected, a video stream related to the statistic is displayed on the monitor. Such a system further optionally comprises the second transmission system denying access to the data stream based on a characteristic of a receiver in the first transmission system, and denying access to the data stream based on a presence of another second display platform for a given account in the system.

A system for delivering broadcast data signals to a plurality of display platforms in accordance with one or more embodiments of the present invention comprises an encoding system for encoding the broadcast data signals into a plurality of data formats, a content data network, coupled to the encoding system, a point of presence, and a network, coupled to the content data network and the point of presence, the point of presence authenticating each display platform and controlling access to the content data network, wherein the point of presence supplies access to a data stream formatted for compatibility with the display platform.

Such a system further optionally comprises the at least one second display platform being at least a computer having a monitor, the broadcast data signals being satellite broadcast signals, the satellite signals further comprising statistics related to the broadcast data signals, the system further delivering metadata to the plurality of display platforms through the network, and the metadata being related to the broadcast data stream.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention comprises a system that allows access to an interactive television channel, allowing a viewer to view a video stream typically delivered via system 100 to monitor 114 via other platforms, namely via personal computer and/or mobile platforms.

Hardware Environment for Computer Delivery of Content

Figure 2:
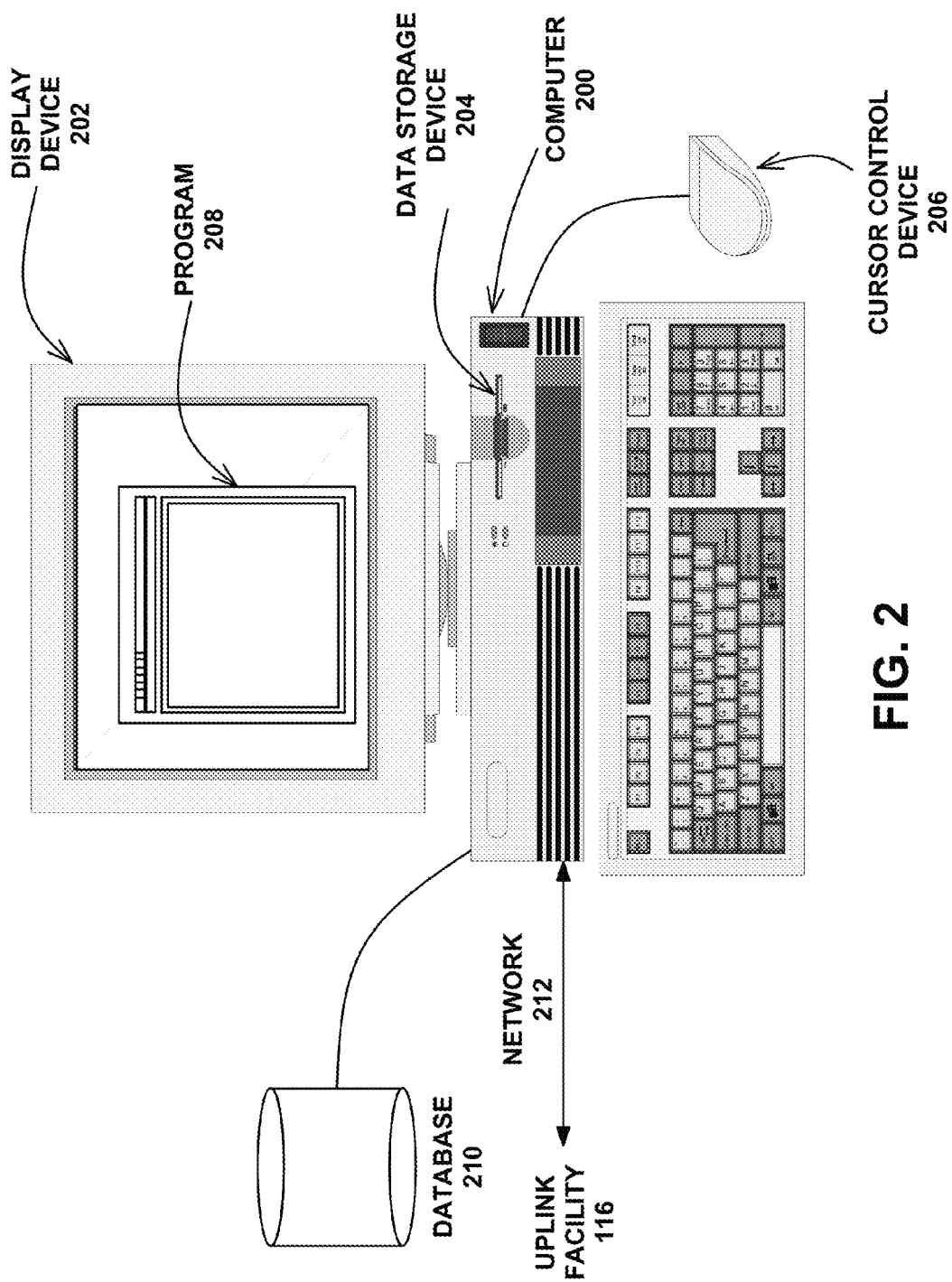
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200. Further, computer 200 may be a cellular telephone, personal data assistant, etc., rather than a desktop or laptop computer 200.

One or more embodiments of the invention are implemented by a computer-implemented program 208, wherein the program 208 is represented by a window displayed on the display device 202.

Generally, the program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc. Further, the program 208 may utilize a database 210 such as a spatial database.

Computer 200 may also be connected to other computers 200 (e.g., a client or server computer) via network 212 comprising the Internet, LANs (local area network), WANs (wide area network), or the like. Further, database 210 may be integrated within computer 200 or may be located across network 212 on another computer 200 or accessible device. Further, uplink facility 118 may send data directly to computer 200 via link 122, and/or wireless networks such that computer 200 can receive the pertinent portion of the uplink signals 116. Uplink facility 118 may send the pertinent portions of uplink signals 116 to a third party for distribution if desired.

Those skilled in the art will recognize that the exemplary environment illustrated in FIG. 2 is not intended to limit the present invention. Indeed, those skilled in the art will recognize that other alternative environments may be used without departing from the scope of the present invention.

Program 208 is, in essence, the uplink signal 116 being delivered to computer 200 in such a fashion that uplink signal 116 is recognizable and displayable by computer 200 on display device 202.

Broadband Delivery of Satellite Broadcast Content

Figure 3:
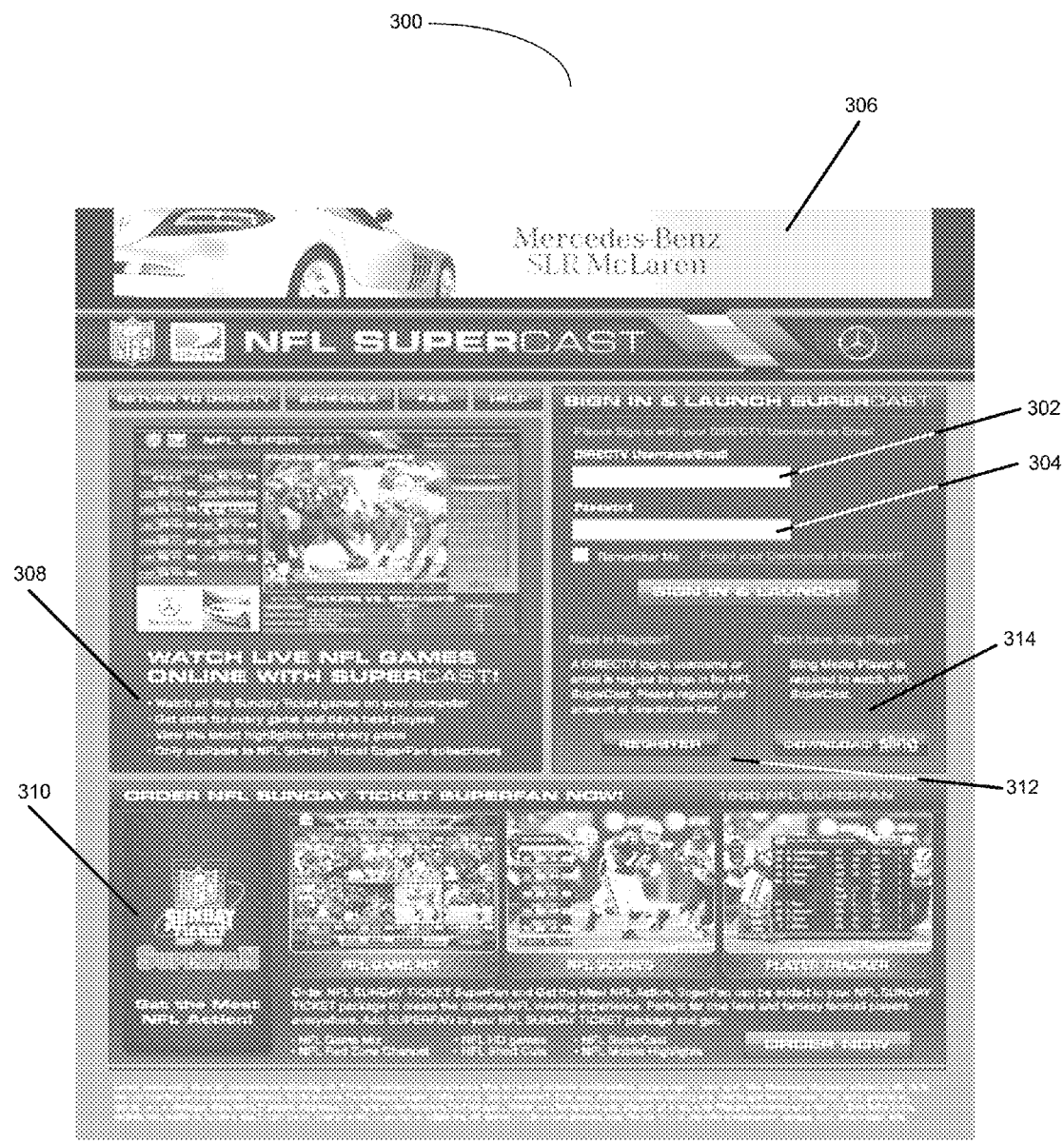
FIGS. 3-4 illustrates examples of login screens and post-login screens in accordance with one or more embodiments of the present invention.

FIG. 3 illustrates an example of a login screen for use with the present invention.

Screen 300 is displayed on display device 202 and is found at a specific web page that is accessible to the user. Typically, this is at DIRECTV.COM which may have a link to the web page, but the screen 300 displaying the web page can be anywhere on the interne.

Typically, screen 300 comprises username area 302, password area 304, ad banner 306, and areas 308-314 which perform various functions applicable to the present invention. For example, and not by way of limitation, username area 302 and password area 304 are typically used to determine whether the person using computer 200 is authorized to view the program 208, and the username entered in username area 302 and password entered in password area 304 are checked against a database of valid customers before allowing access to program 208. Further levels of scrutiny of the user may be applied, such as whether the particular user has a valid account but does not have access to the specific features or package that comprises program 208 may be sent to a screen that requires payment or other input from the user. As shown in FIG. 3, area 312 allows a user to register with the provider of program 208 to allow a user to view program 208, and area 314 allows a user to download additional programming that may be necessary to view program 208.

Program 208 can also be delivered in various formats, e.g., formats compatible with third generation (3G) cellular telephones, WiFi enabled devices, etc., such that various devices 202 can receive streaming video in a format compatible with the individual computer 200/display device 202. Further, although the broadcast of the uplink signal 116 and the program 208 are typically done simultaneously, the change in streaming format and/or protocols to generate the program 208 in the proper format for reception at a given computer 200 may, result in short delays in delivery of the data content.

Areas 306-310 can comprise advertisements for program 208, or for other goods and services, as well as providing additional links or items of possible interest to users that have visited the screen 300.

Figure 4:
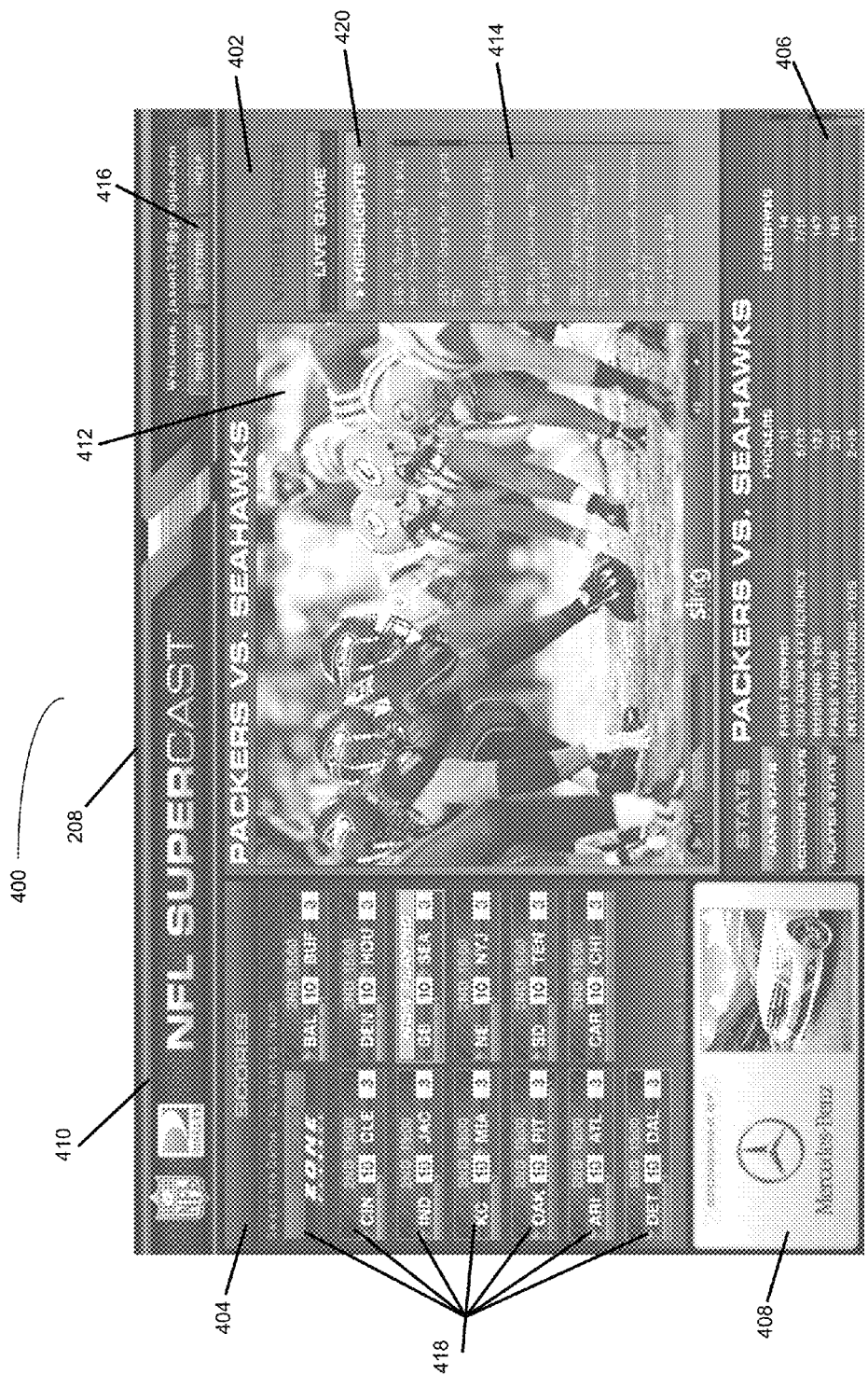

FIG. 4 illustrates a post-login screen in accordance with the present invention.

After confirming a particular user's user name and password via screen 300, and verifying that the particular user is authorized to view program 208, screen 400 is presented on display device 202.

The program 208 comprises, typically, a game area 402, a scores area 404, a statistics area 406, an advertisement area 408, and a banner 410. Program 208 may only be available during certain times, e.g., when there are live events being played, etc., but can also be available at any time with additional or other information of interest to users without departing from the scope of the present invention. If program 208 is not available, an appropriate message may be displayed on screen 400 to inform the user when the program 208 will be available for viewing.

Further, the present invention verifies subscriber authorization for specific services, or levels of service, for each device 202. During log-in, the account access for the mobile device 202 is tied to the IRD 112 for that subscriber, and the access rights for that IRD 112 is applied to that mobile device 202. By verifying the level of access, and the numbers of mobile devices 202 that are accessing a given account, the program 208 can be altered such that access to a given program 208, blackout rules, and features associated with different levels of service, can be allowed or denied on a given web session for that mobile device 202. So, for example, and not by way of limitation, if two mobile devices 202 attempt to access the same user account, the second mobile device 202 would not be authorized to receive a given program 208 without authorization from the subscriber, or access to a given program 208 may not be allowed for a mobile device if that program 208 is subject to blackout rules based on the geographical location of the IRD 112 associated with that subscriber account.

Game Area

Typically, game area 402 presents live or near-real-time streaming video in box 412, and a play-by-play textual display in box 414. Other presentations of audio and/or video can be presented via display device 202 without departing from the scope of the present invention.

The default video presentation in box 412 can be designated to be a currently-contested game, or a "highlights" or "red zone" video stream, at the discretion of the service provider or can also be selected as a user preference if desired. The video presentation can be transmitted at different resolutions, e.g., 480×360 for high and medium bandwidth, or 320×240 for low bandwidth, with the video centered in the box 412 window and a black border around the video, such that additional types of computers 200 with various connections to the internet can still receive the video stream.

The user can be prompted to set their own preferences for reception of the video stream, e.g., whether the user has a high or low bandwidth connection, both upon first use of program 208 or if the user changes computers. The settings button 416 is shown in banner 410.

Scores Area

Scores area 404 typically comprises several boxes 418, typically referred to as chips 418, where each chip 418 represents a given channel that is being broadcast on IRD 112 via system 100.

To activate additional functions of a given chip 418, cursor control device 206 is used to point to or "roll over" a given chip 418, which will activate functions associated with that chip 418. For example, if a chip 418 is rolled over, that chip will display choices for the user, e.g., watch now, view highlights, or other items such as blackout which indicate the user cannot see that particular game. The user then can select one of the display choices via cursor control device 206 to perform the desired function.

The chips 418 can be displayed in any order, however, the chips can also be displayed in a specific order, e.g., the Red Zone Channel chip 418 can always be displayed in the upper left hand corner of scores area 404, chips 418 can be displayed in alphabetical order with the visiting team being the first shown and defining the alphabetical order, etc. Further, games that have not played yet can be shown as chips 418, but can be designated as not selectable and will have no functions associated with a mouse over event.

Games that have been already completed will display "Final" or "Final-OT" and the score of the game in the associated chip 418, and be selectable. A double-click selection of any given chip 418 that represents a completed game typically refreshes the video window 412 with a static graphic prompting users to view highlights of the completed game via the video selector window and statistics.

Red Zone Chip Functions

When rolling over chip 418 representing the Red Zone Channel, choices of "Watch Now" and "Today's Best" display to the user. Selecting 'Watch Now' by clicking that selection launches the "Red Zone Channel" in the video window 412 and "Today's Best" in statistics area 406.

Selecting "Today's Best" refreshes the statistics area 406 with the best player's statistics for the games being contested that particular day. Today's Best' statistics area 406 typically refreshes with up to date statistics every minute that day. Selecting "Today's Best" in Red Zone chip 418 while watching another game in video box 402 will not change the video in video 412, however, Red Zone chip 418 will update with "Today's Best" displaying and statistics area 406 which will then display statistics from today's best performers rather than statistics from the game being viewed in video 412.

Game Chips

When rolling over a particular game chip 418, functional button choices—"Watch Now" and "Stats" will replace the time and quarter available in chip 418. Colors within chip 418 may change to indicate to the user that these choices are available. Clicking within the chip 418 in a given area will launch the "Watch Now" function, and clicking within the chip 418 in another area will launch the "Stats" function of that chip 418.

Selecting "Watch Now" for a particular game will refresh the video area 412 with the live video stream of that game, and will update statistics area 406 with live statistics of the game selected. Games that are blacked out for a user will be messaged that this game is not available as a video stream in the video window but the user will still be able to view statistics for the game, while highlights of that game may still be available in the video window 412.

Selecting "Watch Now" will also change the selected chip 418 to "Now Playing" such that the user knows which chip 418 is associated with the video in video box 402. After selecting "Watch Now" for a given game chip 418, users can select "Stats" on other game chips 418 to view statistics for other games in the Statistics window 406 without interrupting the video stream in video box 412.

To return to viewing statistics for the game that user is watching in statistics box 406, user would rollover chip 418 of game that is "Now Playing" and select the STATS function which would be displayed on rollover of chip 418. Highlights for the game selected in video area 402 will also be available from a button 420 in the video area 402.

Each chip 418 is updated to display which team Depending on field position of team in possession of the ball, yardage change will be animated in field position arrow as a "grow" or "shrink" of the chevron-delimited edge, with the entire field position arrow changing to red should the play having entered the red zone.

Related Data

There also may be other related data for a given chip 418 that is of interest to a viewer. For example, Team identifiers, clock indicators, and scores are indicated in each chip 418. Further, when certain events occur, e.g., a game enters the final two minutes of a period or half, the clock indicator or chip 418 can change colors to further indicate to a viewer that the end of a period is coming up. This may be important for certain types of events, and not as important for others, but is available as a graphical display for the clock indicator within the scope of the present invention.

Further, a "possession" indicator, which is shown as a different color or other graphical indicator, can show which team is currently in possession of the ball, and where that possession is on the field, e.g., mid field, own twenty yard line, etc., such that the user can quickly determine what the status of each game is without changing the video stream in box 412 unless necessary. The indicator can have different lengths and colors to indicate events in the game, e.g., when a team is about to score, when a turnover occurs, etc.

When certain game conditions occur, position indicators may also change color as well as size. For example, when a team gets within twenty yards of the end zone on offense, they are considered in "the red zone" of the field. To indicate such a game condition, the position indicator can turn red, which indicates to a viewer that a team is inside scoring range for either a touchdown or a field goal. When a team scores, the position indicator can flash or turn green, to indicate that the score of the game recently changed. Other indicators are possible, e.g., when a penalty is called, one or both of the position indicators can turn yellow, when a turnover occurs, the recovering team's position indicators can flash orange, etc.

For other types of video feeds, possession indicators may provide other types of information. For example, in a hockey game, possession of the puck by a given team does not necessarily indicate an advantage in the game or an impending score. However, if one hockey team is on a power play, or has a two-person advantage, possession indicator can indicate these condition by changing color, flashing, or other graphical indication to the viewer, such that the game condition is known by glancing at the chips 418 in an overview fashion in scores area 404, rather than switching video feeds in video box 412 to view each video feed in detail to determine the progress of each game. So, for example, if one hockey team is on a power play (one-person advantage), the possession indicator may be green. If one hockey team has a two-person advantage, the possession indicator may be red, or flashing green, to indicate a different game condition to the viewer.

The possession indicator, clock indicator, or team identifiers can also change color, flash on and off, or present any number of visual clues to the viewer, to indicate what is going on within each contest represented by chips 418.

Ad Space

Advertisement area 408 is provided to allow for sponsorship or other revenue stream associated with screen 400 and/or program 208. If the user places the cursor control device 206 cursor over the advertisement area 408, a pop-up ad can occur, and, if desired, selecting the advertisement area 408 by "clicking" the cursor control device 206 in the advertisement area 408 will open a new browser window on display device 202, where the URL of the new browser window is related to the advertisement being displayed in advertisement area 408.

Video

When a chip 418 is selected by the user, the video area 402 is switched to display the video associated with that chip 418. Further, additional functions, such as play/stop/pause of the video, sending the video box 412 to a full-screen mode, audio level and muting, and other functions are available to the user. These functions are also available for the game highlights of each game when button 420 is selected. To return to screen 400 from a full screen version of video box 412, the user will select or click somewhere in the full screen of video box 412, which will indicate to computer 200 to return to screen 400.

Selecting Highlights button 420 generates a chronological list (from first to last) of individual game highlights associated with the game selected. When a user selects an individual highlight, text describing the highlight is shown in box 414, or elsewhere on screen 400.

Statistics Area

To update statistics area 406, a user can select a chip 418 for viewing in video area 402. Further, by selecting the statistics area of a given chip 418, the selected chip 418's statistics will be shown in statistics area 406.

Red Zone Statistics

Default statistics displayed when selecting "Today's Best" from red zone chip 418 is typically a numbered list of the top players from the day's games. The statistics can be presented in categories, e.g., rushing, passing, tackles, hits, runs, etc., with the ability to designate a given statistic as a default statistic to be first presented when the top players' statistics are shown. If necessary or desired, a scroll bar can be used to allow additional statistics to be accessible to the user without paging through statistics.

Sub-menus can be accessed in statistics area 406 in several ways, e.g., selecting a specific player, selecting a specific team, selecting a specific type of statistic, etc.

Mobile Phone Delivery of Satellite Broadcast Content

Figure 5:
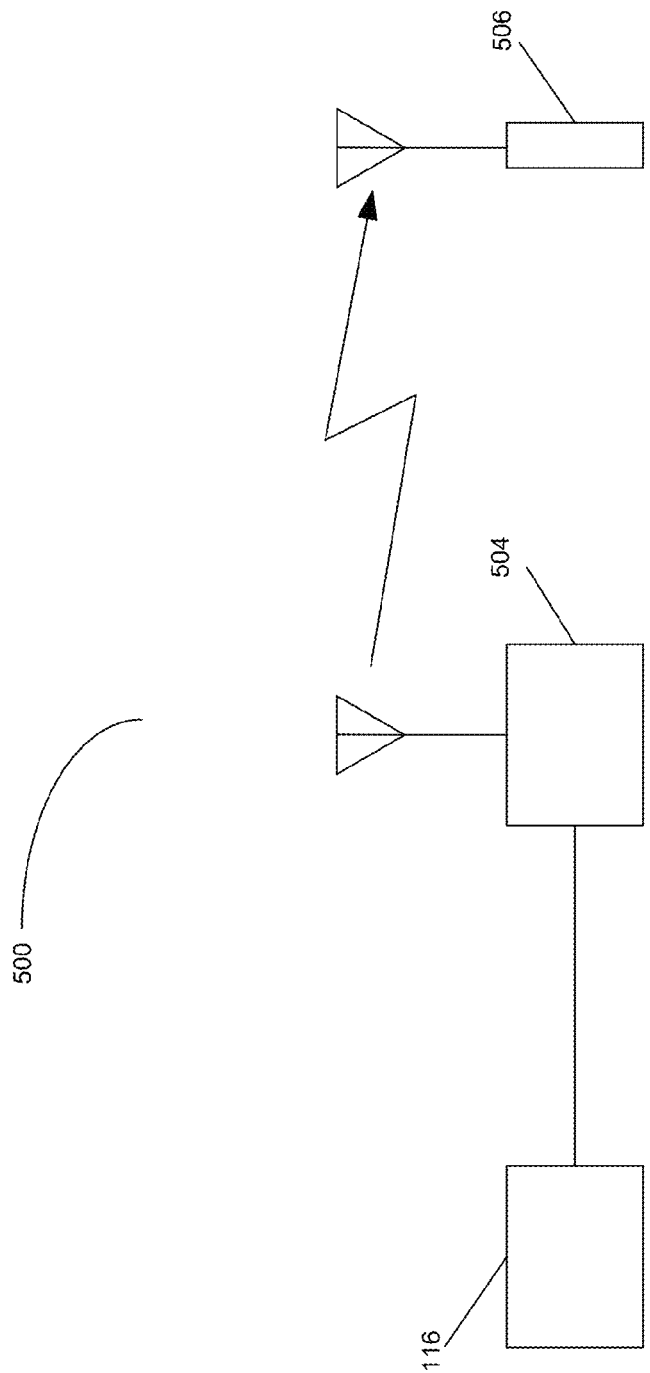
FIG. 5 illustrates a system for delivery of content to mobile platforms in accordance with the present invention.

FIG. 5 illustrates a system for delivery of content to mobile platforms in accordance with the present invention.

System 500 illustrates uplink facility 116 connected to a telephone system 504, where system 504 can be a third party delivery system, third party provider, or the PSTN, or any combination thereof. System 504 then wirelessly delivers content to mobile device 506, where mobile device 506 represents all mobile users, e.g., PDA, cellular phones, etc.

Content is thus delivered from uplink facility 116 to mobile device 506, where the delivered content is the data being delivered via uplink signals 116 and downlink signals 120 to IRDs 112, except now the content is in the format acceptable and readable by mobile devices 506. Mobile devices 506 may be required to have specific features, e.g., be WAP enabled, be xHTML compatible, have video download and playback capabilities, etc., and may also be required to have authorization to view the content as described with respect to FIGS. 3 and 4.

Figure 6:
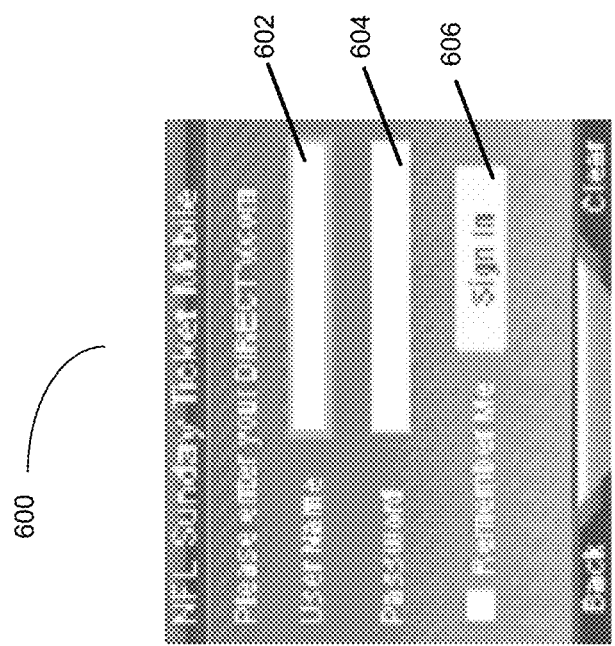
FIG. 6 illustrates a login screen in accordance with the present invention.

FIG. 6 illustrates a login screen in accordance with the present invention.

Similar to FIGS. 3 and 4, FIG. 6 shows a login screen 600 displayed on mobile device 506. The user provides a user name in area 602 and a password in area 604, and signs in by pressing a button or selecting button 606 using mobile device 506.

Figure 7:
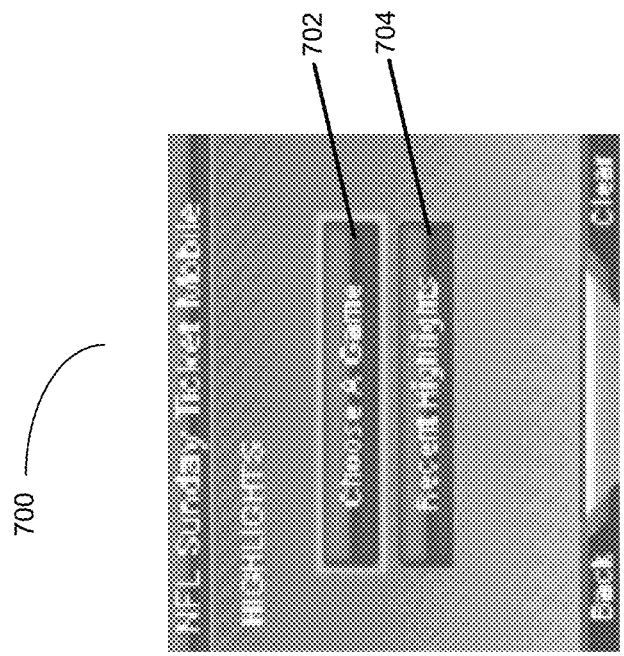
FIG. 7 illustrates a post login screen in accordance with the present invention.

FIG. 7 illustrates a post login screen in accordance with the present invention.

Screen 700 allows a user to select, using the mobile device 506, a specific game via button 702 or recent highlights from the day using button 704. Other buttons can be provided without departing from the scope of the present invention. One or more buttons 702-704 may only be available at specific times, e.g., if there are no games going on, there may not be any highlights, etc. Further, the system provider can disable one or more buttons 702-704 for other reasons if desired.

Figure 8:
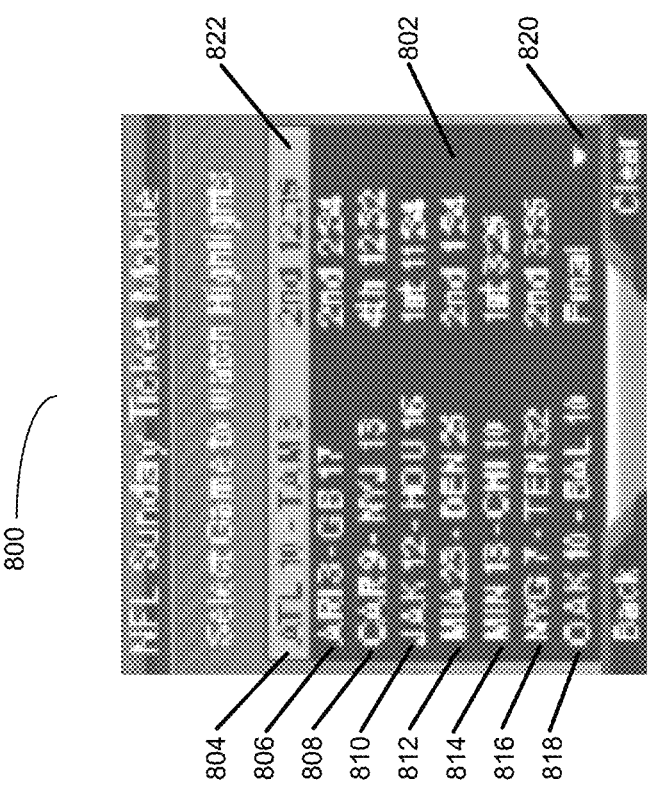
FIG. 8 illustrates a mobile screen with a list of contests in accordance with the present invention.

When button 702 is selected via mobile device 506, the user will be directed to a screen showing a list of games being contested, shown in FIG. 8. When the user selects button 704 via mobile device 506, the user will be directed to a screen showing a list of recent highlights, shown in FIG. 10.

Choose A Game Option

FIG. 8 illustrates a mobile screen with a list of contests in accordance with the present invention.

Screen 800 illustrates an area 802 with several contests 804-818, and an indicator 820 that indicates there are additional contests available for selection. Cursor 822 can be moved using buttons on the mobile device 506 to highlight a game, and selection of a given game can be done by another button on mobile device 506.

Because of the limited screen sizes available on mobile devices 506, shortened team monikers, e.g., Atlanta is listed as ATL, etc., and abbreviated time indicators, e.g., if a game is in the fourth quarter and there are twelve minutes and twenty-two seconds left, the indicator would read "$4^{th}$ 12:22" so that the user can readily see what the status of that game is. Further, if desired, team names can be highlighted or colored to indicate action in the game, e.g., if Atlanta is in the red zone, Atlanta's team moniker ATL can appear in red, or if Atlanta recently scored a touchdown, the moniker ATL and/or the Atlanta Score can flash in green, etc.

The contests 802-818 can be listed in any order on screen 802, or an order can be assigned as desired. Within screen 800, an area can be designated for sponsorship or other advertisement as desired.

Figure 9:
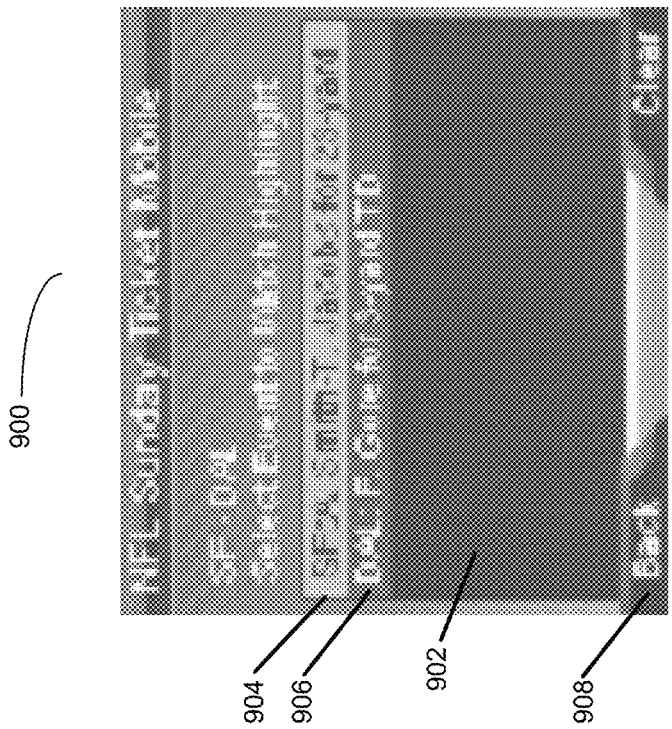
FIG. 9 illustrates a game-specific highlights mobile screen in accordance with the present invention.

FIG. 9 illustrates a game-specific highlights mobile screen in accordance with the present invention.

Once a game is selected via cursor 820, screen 900 is presented to the user on mobile device 506. Area 902 comprises entries 904-906, which are selectable by cursor 908, such that a specific play within the selected contest can be displayed on mobile device 506. Also within screen 900, the game selected, as well as the score of the game and the teams contesting the game, can also be presented.

Once a highlight is selected via cursor 908, the video of that particular highlight play is downloaded to and presented on the mobile device 506. Highlights are selected based on a number of criteria, e.g., in football, a play of more than 25 yards, an interception, a scoring play, a blocked punt or field goal, etc. These plays are described in entries 904-906 such that the user can see some information about the highlight prior to selection of the video for download to the mobile device 506. In other sports, other plays, such as home runs in baseball, double plays in baseball, etc., can be described in entries 904-906 such that the user can see what play is to be downloaded. Individuals involved in the play can also be mentioned in the entry 904-906 so that the user has additional information on who was involved in the play.

Navigation to other screens 800, 700, etc. can be accomplished via other keys on the mobile device 506, as shown by the back key 908, or other keys can be assigned to directly jump to other screens 700, 800, etc.

Recent Highlights Option

Figure 10:
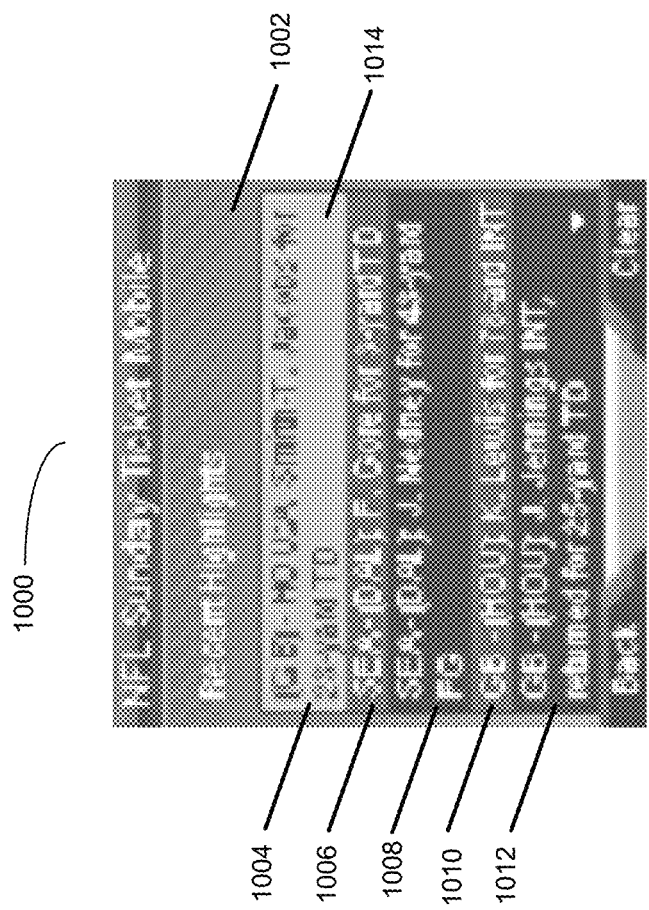
FIG. 10 illustrates a mobile screen with a list of recent highlights in accordance with the present invention.

FIG. 10 illustrates a mobile screen with a list of recent highlights in accordance with the present invention.

Once recent highlights is selected via button 704, screen 1000 is presented to the user on mobile device 506. Area 1002 comprises entries 1004-1012, which are selectable by cursor 1014, such that a specific play within the selected contest can be displayed on mobile device 506.

Once a highlight is selected via cursor 1014, the video of that particular highlight play is downloaded to and presented on the mobile device 506. Highlights are selected based on a number of criteria, e.g., in football, a play of more than 25 yards, an interception, a scoring play, a blocked punt or field goal, etc. These plays are described in entries 1004-1012 such that the user can see some information about the highlight prior to selection of the video for download to the mobile device 506. In other sports, other plays, such as home runs in baseball, double plays in baseball, etc., can be described in entries 1004-1012 such that the user can see what play is to be downloaded. Individuals involved in the play can also be mentioned in the entry 1004-1012 so that the user has additional information on who was involved in the play.

Interactive Gambling

The present invention allows for viewers to interactively place bets using their computer 200, or mobile device 506, on contests where such bets are legally allowed. A viewer can place proposition bets, e.g., first score of the day, first penalty, etc., and obtain points or other remuneration for either gambling against others for money or for fun. A viewer can also obtain alerts related to fantasy football players, etc. for fantasy football leagues, fantasy baseball leagues, etc.

Fantasy Gaming

Within the scope of the present invention, users can choose fantasy teams and pit these teams against other viewer's fantasy teams. These fantasy matchups can be shown on the L-wrap screen if desired.

Fantasy rosters can be filled out via IRD 112, or via internet access through computer 200 or mobile device 506, via fantasy providers such as Yahoo, Sportsline, ESPN, and Fox Sports. Alerts can also be set via internet access as well as frequency of alerts and which team alerts are to be sent for.

Several types of alerts, whether used for fantasy gaming or not, can be set. For example, and not by way of limitation, specific types of plays, such as a running back rushing for more than 10 yards on a single play, rushing for a touchdown or a two point conversion, or when the given play gives a specific running back a total rushing yardage of a given amount for the game, e.g., 100 yards, 150 yards, etc. Similarly, receivers and quarterbacks can have separate alerts set, as can kickers or entire defensive teams when certain events occur during a game.

Similarly, for other sports, individual or team events that occur can force an alert. For example, and not by way of limitation, baseball alerts can be set when batters hit home runs or extra-base hits, when pitchers strike out batters, or when teams score more than a certain number of runs in an inning. Further, alerts can be set when defenses turn double plays.

A different frequency of alerts can also be set based on the type of play or event. For example, running backs may often run for more than ten yards in a single carry, but rarely will they run for more than twenty yards in a single carry. Further, double plays are common in baseball, but triple plays are not, and home runs are fairly common occurrences, but grand slams are not. A different type of alert can be shown on monitor 114 as those shown on mobile device 506 or computer 200 when the rarer event takes place, such that the viewer knows that a truly special event has taken place with respect to another game or one of the viewer's fantasy players or teams.

Fantasy gaming within the present invention also may comprise a "predetermined" fantasy team or teams, or predetermined individual players in a given game, that novice fantasy players can choose from. This allows for viewers to play with some assistance from more knowledgeable players that have selected balanced teams, rather than requiring a viewer to have in-depth knowledge of each player selected. Further, such predetermined teams or groups of teams can be matched against each other or against individually selected groups of players for fantasy gaming. Cafeteria style purchases of players can also be provided, with different prices for higher or lower rated players, to make selection of individual players more balanced.

Each fantasy team can also select a "franchise player" which can be used to determine the player that each viewer believes will score the most points per game/week/season.

Points for fantasy gaming competitions, whether it is head-to-head, multiple contests, or franchise player point totals, can be compiled for the week or for any portion of or the entire season, and winners can be selected and granted prizes, such as free system access for a certain amount of time, reduced rates on pay-per-view programming, or other prizes determined by the system provider. The fantasy selections made by the user may affect the highlights shown or the order in which the highlights are shown on mobile device 506 and/or computer 200 when highlights chip 418 is selected.

While uplink facility 118 is delivering uplink signals 116 to satellites 102-106, in a substantially simultaneous manner, uplink facility 116, or a similar facility coupled to uplink facility 116, is delivering at least a portion of uplink signals 116 in different formats to create program 208 for computer 200 and screens 600-1000 and video downloads to mobile devices 506. So, for example, and not by way of limitation, the portion of the uplink signals may be just metadata that is delivered to mobile devices 506, rather than the entire video stream which is part of uplink signals 116, and, further, a different portion of uplink signals 116, e.g., the metadata and video for only a select few channels, can be delivered to computer 200 via network 212.

Alternative Display Versions

FIGS. 11-16 illustrate alternative embodiments of one or more features in accordance with the present invention.

Figure 11:
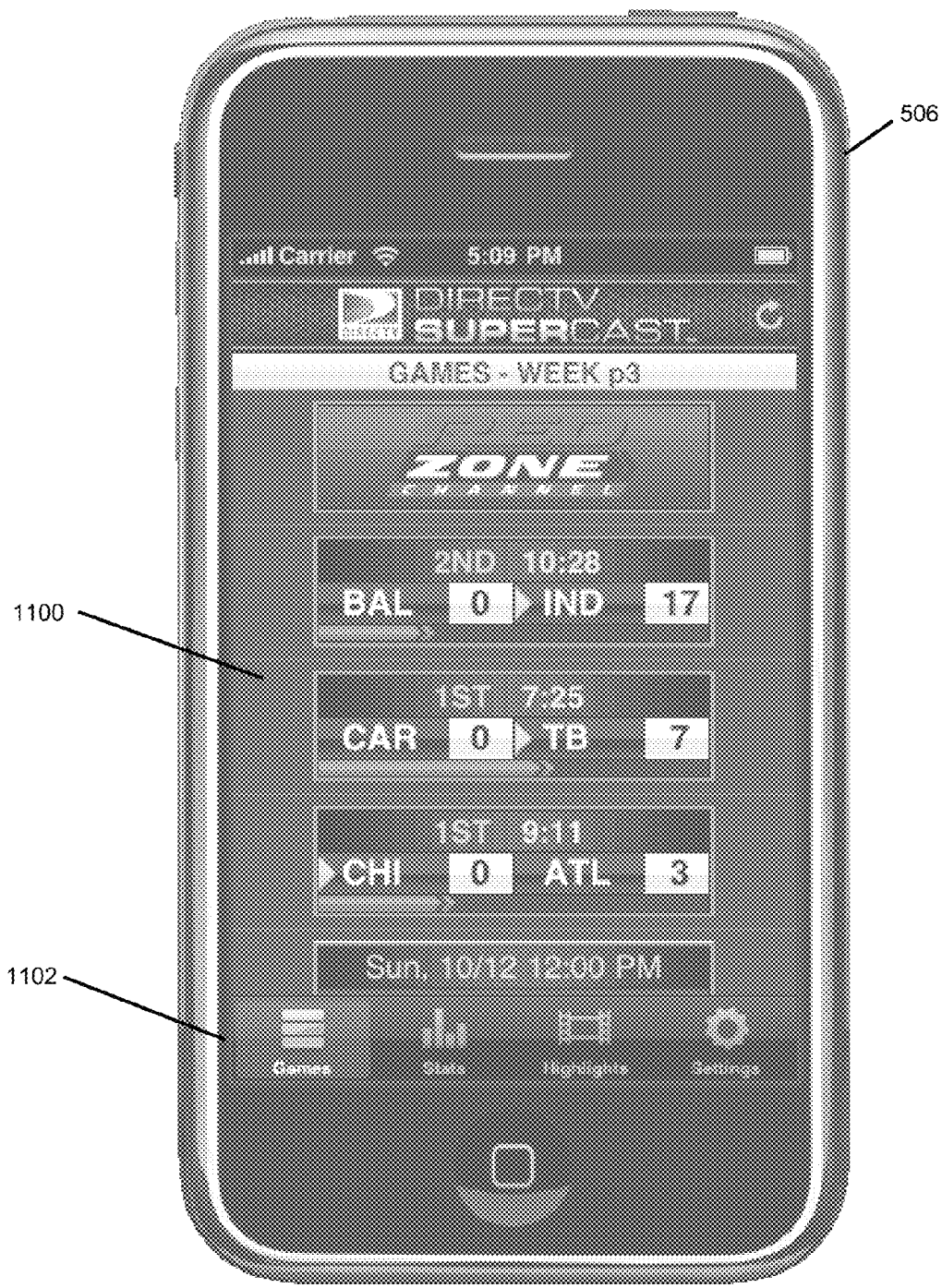
FIGS. 11-16 illustrate alternative embodiments of one or more features in accordance with the present invention.

FIG. 11 illustrates a mobile device 506 with a data feed that has been processed and presented in a graphical manner compatible with that particular mobile device 506. Upon logon with the mobile device 506, a game summary display 1100 and various choices for video display via toolbar 1102 can be selected. By authenticating and verifying the type of mobile device 506, e.g., iPhone, personal computer, Palm, etc. that is logging in to the system 500, different data streams are forwarded to the mobile device 506 based on mobile device compatibility with the data stream(s) available.

Figure 12:
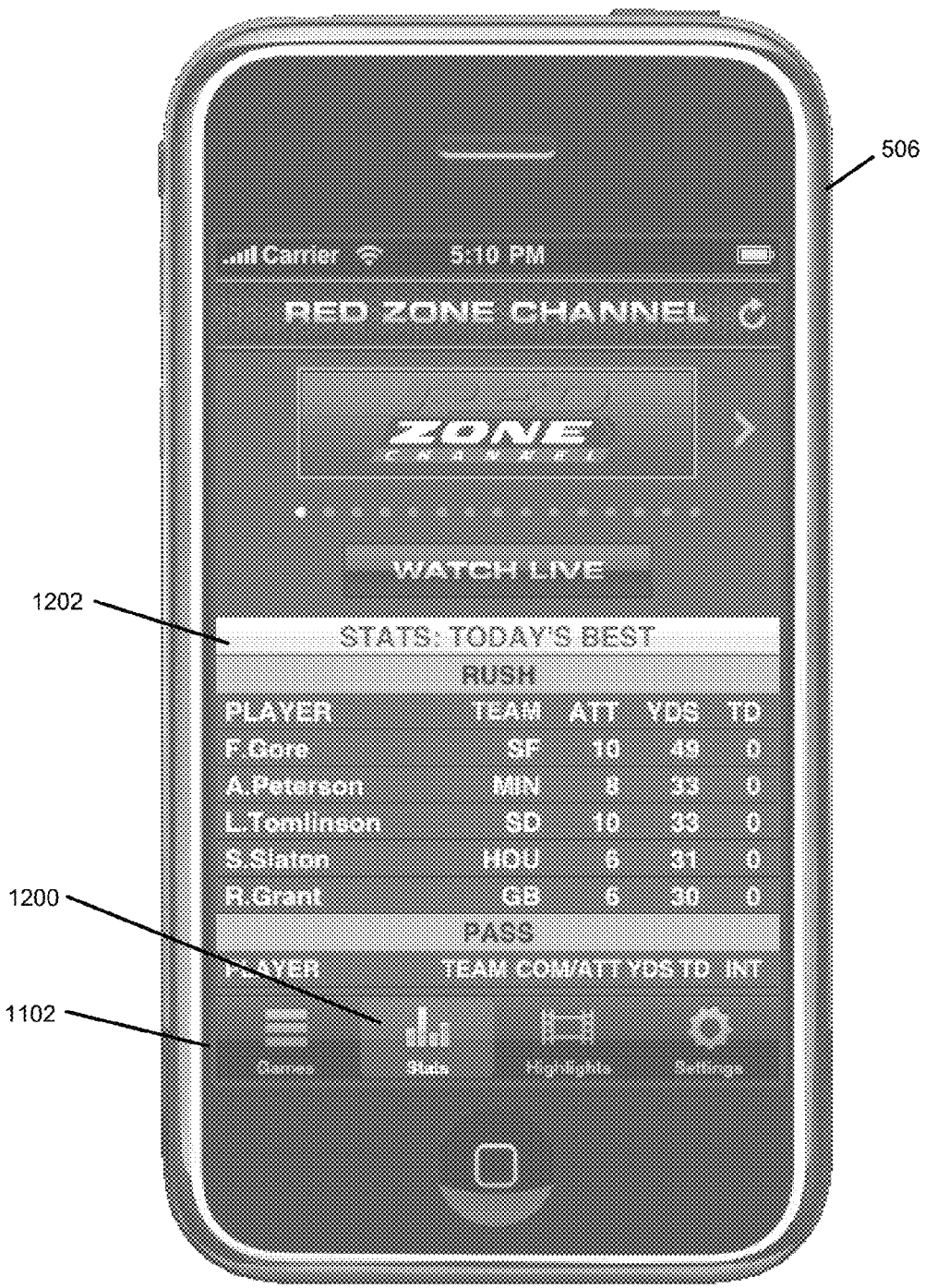
Figure 13:
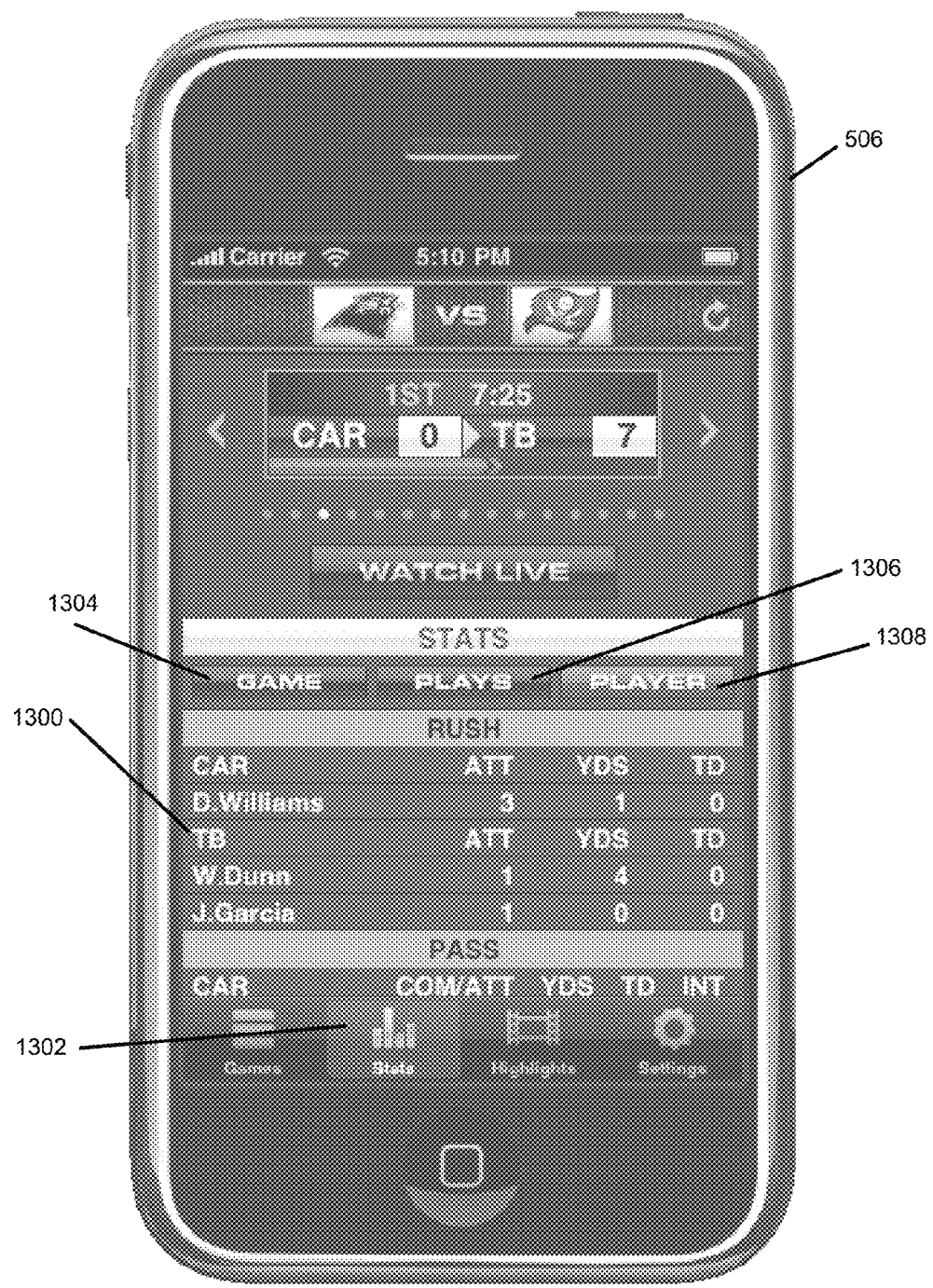

FIG. 12 illustrates selection of a "Stats" button 1200 on toolbar 1102. Now, statistics 1202 are displayed on mobile device 506. FIG. 13 illustrates different statistics shown by player, game, or specific plays within statistics display 1202, rather than a "today's best" performances list as shown in FIG. 12.

Figure 14:
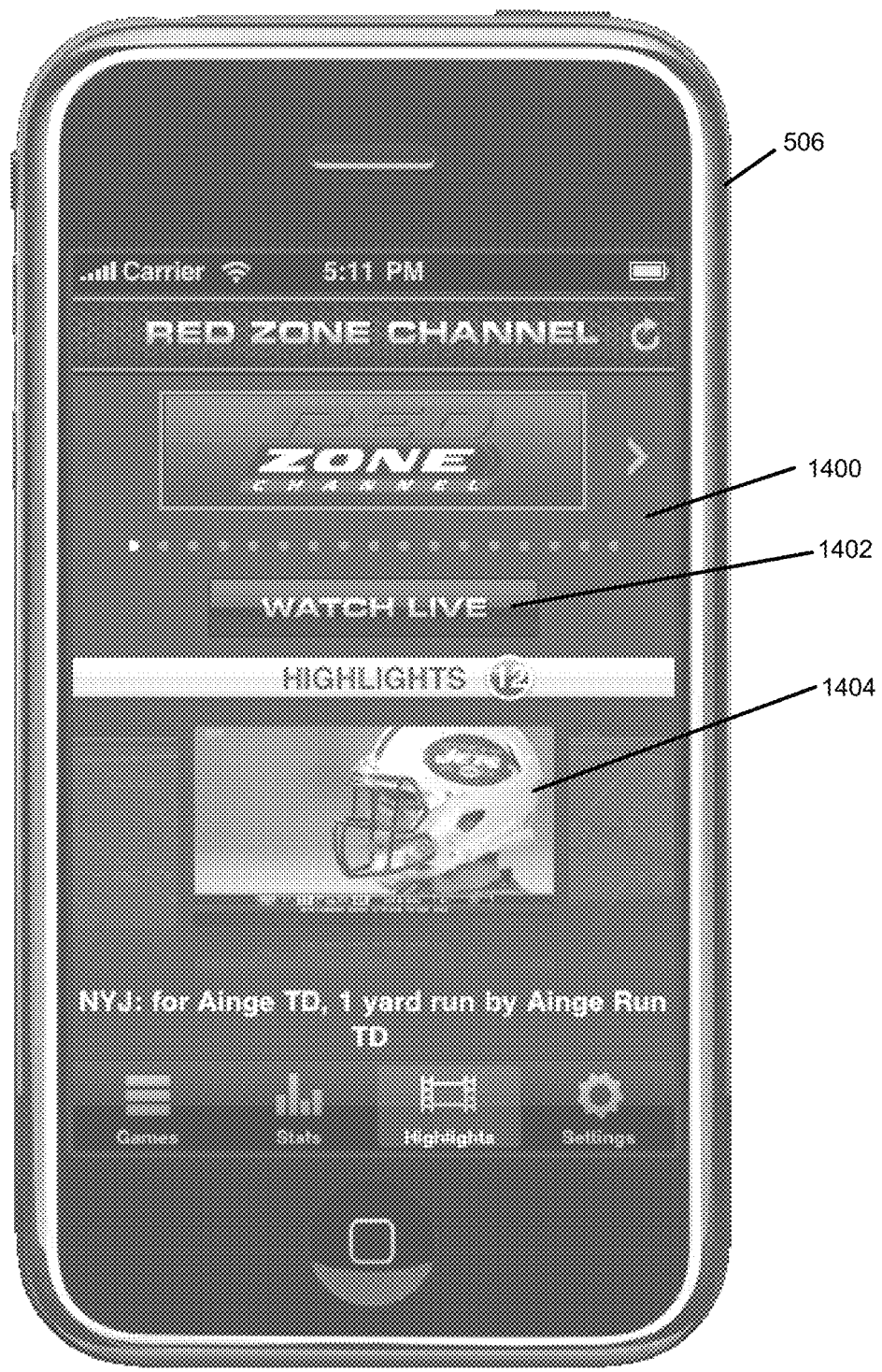
Figure 15:
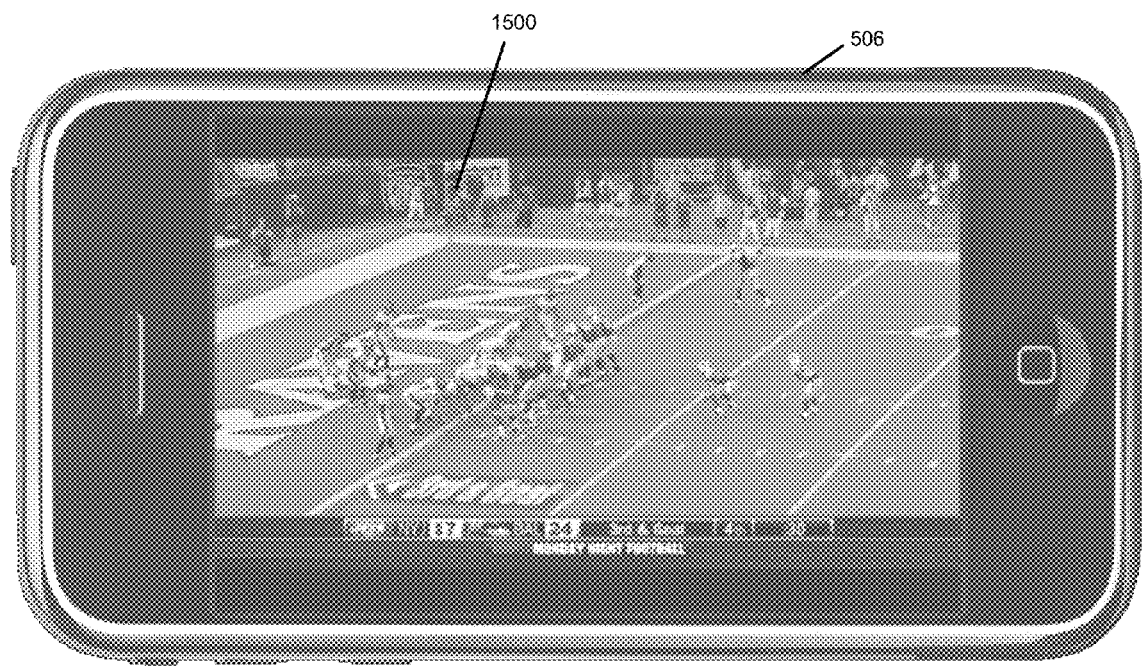

FIG. 14 illustrates a highlights channel 1400 displayed as toolbar 1102 "highlights" selection 1402 is shown. Upon activating button 1404, a video display 1500 of a current video stream would be displayed on mobile device 506, as shown in FIG. 15.

Figure 16:

FIG. 16 illustrates a mobile device 506 that has attempted to log in to system 500 when another mobile device 506 is also logged in on system 500. The subscriber has the ability to allow multiple mobile devices 506 to log in to system 500 if desired, however, by monitoring a given internet session with respect to a given subscriber account, additional access to the broadband data streams can be blocked or allowed based on subscriber desires as well as system provider's rules. So, for example, and not by way of limitation, a given subscriber can pay additional money to allow additional mobile devices 506 to access the data streams via that account. Thus, both subscribers and system providers can control the number of mobile devices 506 that are accessing a subscriber's account.

System Diagram

Figure 17:
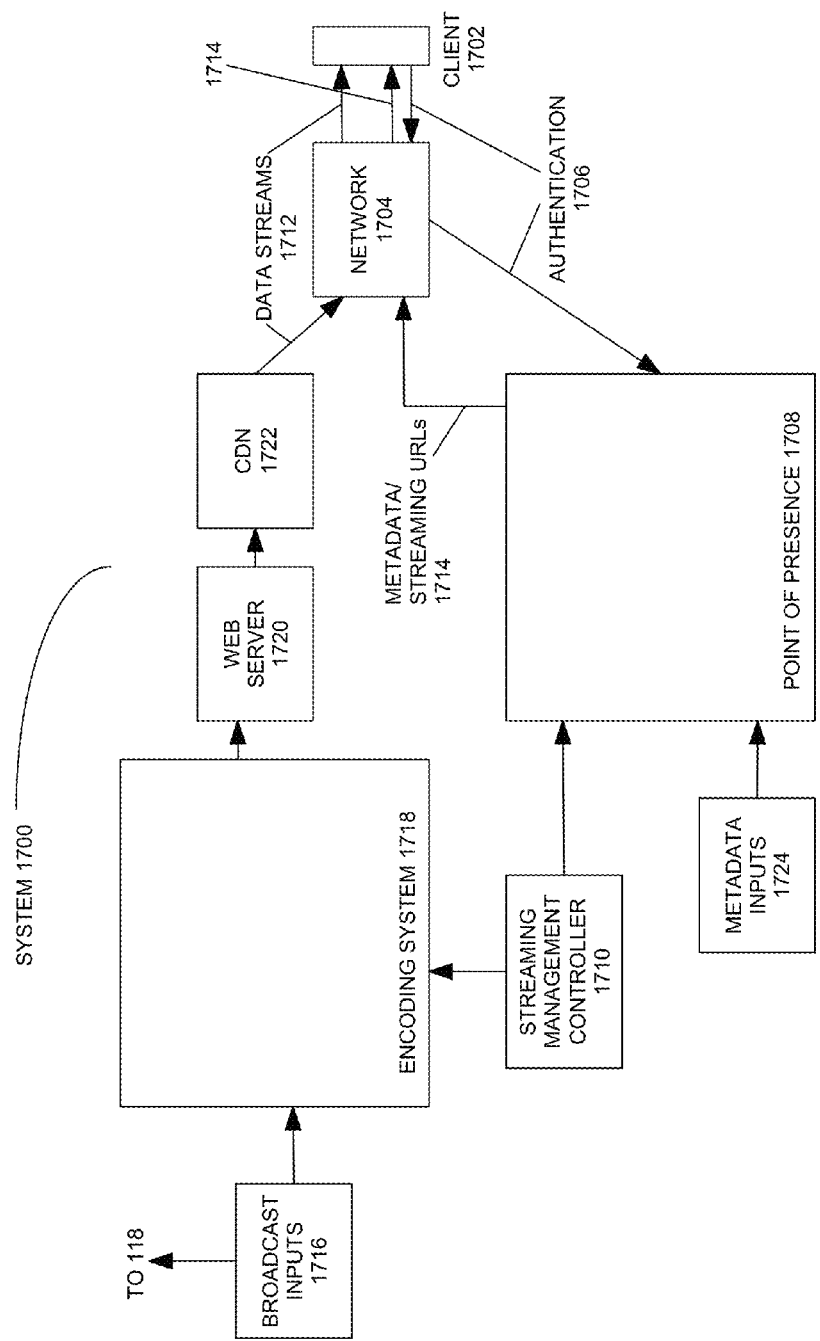
FIG. 17 illustrates a system diagram in accordance with one or more embodiments of the present invention.

FIG. 17 illustrates a system diagram in accordance with one or more embodiments of the present invention.

System 1700 shows client 1702 using network 1704 to access system 1700 via an authentication request 1706 to point of presence (POP) 1708. Such authentication is shown in FIG. 6 where user names and passwords are supplied to POP 1708 and a user account is verified.

Figure 1:
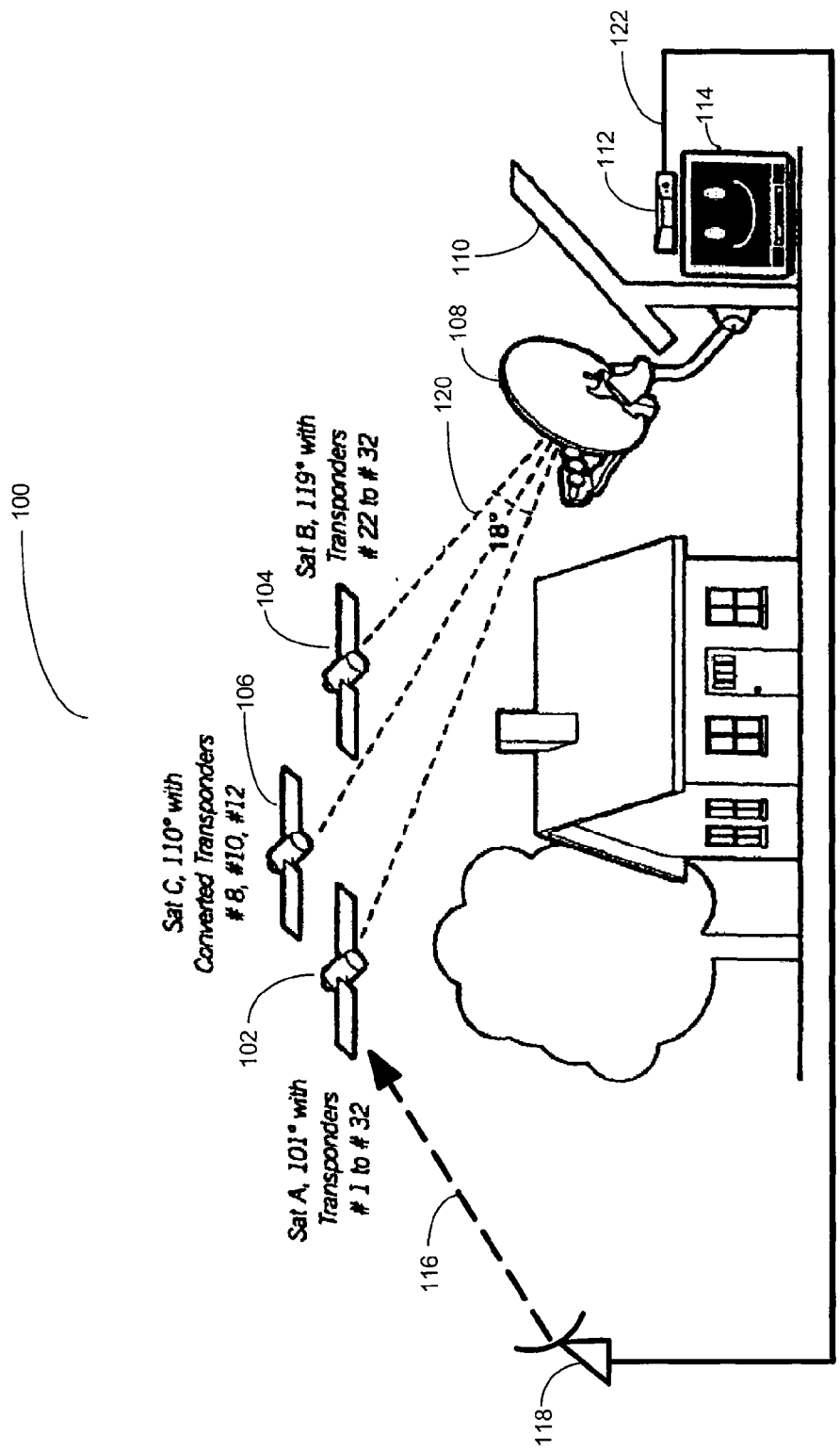
FIG. 1 illustrates a typical satellite television installation of the related art.

Once client 1702 is verified as having an account within system 1700, streaming management controller 1710 allows access to data streams 1712 and metadata/streaming URL location data 1714 to be returned to client 1702 via network 1704. Data streams 1712 originate as broadcast inputs 1716, which are encoded by encoding system 1718 and provided to web server 1720 and to content data network 1722, as well as having broadcast inputs 1716 provided to uplink facilities 118 to be transmitted via system 100 shown in FIG. 1. The data streams 1712 can then be accessed by client 1702 either directly through network 1704 or via the streaming URLs provided as data 1714 from POP 1708. Streaming management controller 1710 controls which broadcast streams 1716 are encoded by encoding system 1718 and where they are located on CDN 1722 and/or web server(s) 1720.

Streaming management controller 1710 also controls POP 1708, and system 1700 can comprise a plurality of POPs 1708 without departing from the scope of the present invention. POP 1708 also receives metadata inputs 1724, which can comprise statistics, data related to the broadcast inputs 1716, or other data to be transferred to client 1702 via system 1700.

Data streams 1712 and metadata 1714 are sent via network 1704 in various formats, e.g., MPEG-2, MPEG-4, etc., such that various clients 1702 can display the data streams 1712 and metadata 1714. So, for example, one type of cellular telephone client 1702 may require H.264/MPEG-2 video data streams 1712, while other clients may be able to display MPEG-4 video data streams 1712. Thus, POP 1708, and CDN 1722/web server 1720 provide data streams in various formats. During authentication 1706, each client 1702 provides information to POP 1708 to indicate to POP 1708 which format of data stream 1712 and/or metadata 1714 that particular client can display, or any preferences that client 1702 may have for data streams. For example, although client 1702 can display MPEG-4 data, client 1702 may prefer MPEG-2 data because the data stream 1712 can be processed faster at client 1702, the increase in resolution for MPEG-4 data may not be visible on client 1702's display due to small display size, or client 1702 may not wish to pay additional money for the increased quality of an MPEG-4 data stream.

CONCLUSION

The present invention discloses a method and apparatus for simultaneous broadcast of satellite signals on mobile and computer platforms.

A system for delivering satellite signals to a plurality of display platforms in accordance with one or more embodiments of the present invention comprises a first transmission system for delivering the satellite signals to a first display platform via at least one satellite, and a second transmission system, coupled to the first transmission system, for delivering at least a portion of the satellite signals to at least one second display platform, the first transmission system and the second transmission system transmitting in a substantially simultaneous manner, wherein the second transmission system transmits a data stream formatted for compatibility with the at least one second display platform.

Such a system further optionally comprises the at least one second display platform is at least a computer having a monitor, the computer is coupled to the system via a network, the portion of the satellite signals delivered to the computer comprises at least a video stream, the portion of the satellite signals delivered to the computer further comprises statistics related to the video stream, the portion of the satellite signals delivered to the computer further comprises a second statistical area, wherein the second statistical area comprises a plurality of selectable areas to switch the video stream to a new video stream associated with each of the plurality of selectable areas in the second statistical area, when an area in the plurality of selectable areas is selected, the new video stream is displayed on the monitor, the at least one second display platform further comprises at least a mobile device having a screen, the mobile device is coupled to the system via a wireless network, the portion of the satellite signals delivered to the mobile device comprises at least statistics related to a video stream being transmitted on the first transmission system, the statistics are selected based on a characteristic of the statistic, and when a statistic is selected, a video stream related to the statistic is displayed on the monitor. Such a system further optionally comprises the second transmission system denying access to the data stream based on a characteristic of a receiver in the first transmission system, and denying access to the data stream based on a presence of another second display platform for a given account in the system.

A system for delivering broadcast data signals to a plurality of display platforms in accordance with one or more embodiments of the present invention comprises an encoding system for encoding the broadcast data signals into a plurality of data formats, a content data network, coupled to the encoding system, a point of presence, and a network, coupled to the content data network and the point of presence, the point of presence authenticating each display platform and controlling access to the content data network, wherein the point of presence supplies access to a data stream formatted for compatibility with the display platform.

Such a system further optionally comprises the at least one second display platform being at least a computer having a monitor, the broadcast data signals being satellite broadcast signals, the satellite signals further comprising statistics related to the broadcast data signals, the system further delivering metadata to the plurality of display platforms through the network, and the metadata being related to the broadcast data stream.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims attached hereto and the full range of equivalents to the claims attached hereto.

What is claimed is:

1. A system for delivering satellite signals to a plurality of display platforms, comprising:
   (a) a first transmission system for delivering the satellite signals to a first display platform via at least one satellite, wherein:
      (i) the first display platform comprises an integrated receiver-decoder (IRD);
      (ii) the IRD is associated with a subscriber;
      (iii) the IRD has access rights that determine whether the subscriber is authorized to access content in the satellite signals; and
      (iv) the first transmission system delivers the satellite signals to the IRD in a first format compatible with the IRD; and
   (b) a second transmission system, coupled to the first transmission system, for delivering at least a portion of the satellite signals to at least one second display platform, wherein:
      (i) the second transmission system transmits the portion of the satellite signals in a second format compatible with the at least one second display platform, wherein the first format is different from the second format, and wherein the first transmission system is different from the second transmission system;
      (ii) a first second display platform is a mobile device; and
      (iii) authorization to access the portion of the satellite signals in the second format on the mobile device is tied to the access rights for the IRD, wherein such access rights comprise blackout rules based on a geographical location of the IRD and a number of devices accessing a subscriber account.

2. The system of claim 1, wherein an additional second display platform is a computer having a monitor.

3. The system of claim 2, wherein the computer is coupled to the system via a network.

4. The system of claim 2, wherein the portion of the satellite signals delivered to the computer comprises at least a video stream.

5. The system of claim 4, wherein the portion of the satellite signals delivered to the computer further comprises statistics related to the video stream.

6. The system of claim 5, wherein the portion of the satellite signals delivered to the computer further comprises a second statistical area, wherein the second statistical area comprises a plurality of selectable areas to switch the video stream to a new video stream associated with each of the plurality of selectable areas in the second statistical area.

7. The system of claim 6, wherein when an area in the plurality of selectable areas is selected, the new video stream is displayed on the monitor.

8. The system of claim 1, wherein the mobile device is coupled to the system via a wireless network.

9. The system of claim 8, wherein the portion of the satellite signals delivered to the mobile device comprises at least statistics related to a video stream being transmitted on the first transmission system.

10. The system of claim 9, wherein the statistics are selected based on a characteristic of the statistic.

11. The system of claim 10, wherein when a statistic is selected, a video stream related to the statistic is displayed on the mobile device.

12. A system for delivering broadcast data signals to a plurality of display platforms, comprising:
   (a) an encoding system for encoding the broadcast data signals into a plurality of different data formats;
   (b) a content data network, coupled to the encoding system;
   (c) a point of presence; and
   (d) a network, coupled to the content data network and the point of presence, the point of presence authenticating each display platform and controlling access to the content data network, wherein:
      (1) the network comprises at least a first display platform and a second display platform, wherein the first display platform is compatible with broadcast data signals in a first data format via a satellite network system and the second display platform is compatible with broadcast data signals in a second data format via a network system different than satellite;

(2) the first display platform comprises an integrated receiver-decoder (IRD), wherein the IRD is compatible with data broadcast in the first data format;

(3) the IRD is associated with a subscriber;

(4) the IRD has access rights that determine whether the subscriber is authorized to access content in the broadcast data signals;

(5) the second display platform is a mobile device; and (6) authorization to access the content in the broadcast data signals in the second data format on the second display platform is tied to the access rights for the IRD, wherein such access rights comprise blackout rules based on a geographical location of the IRD and a number of devices accessing a subscriber account.

13. The system of claim 12, wherein an additional second display platform is a computer having a monitor.

14. The system of claim 12, wherein the broadcast data signals are satellite broadcast signals.

15. The system of claim 14, wherein the satellite signals further comprises statistics related to the broadcast data signals.

16. The system of claim 12, wherein the system further delivers metadata to the plurality of display platforms through the network.

17. The system of claim 16, wherein the metadata is related to the broadcast data signals.

* * * * *